(12) United States Patent
Huang

(10) Patent No.: US 10,954,988 B2
(45) Date of Patent: Mar. 23, 2021

(54) SCREW WITH FLAT DRILLING END

(71) Applicant: Shu-Chin Huang, New Taipei (TW)

(72) Inventor: Shu-Chin Huang, Taichung (TW)

( * ) Notice: Subject to any disclaimer, the term of this patent is extended or adjusted under 35 U.S.C. 154(b) by 0 days.

(21) Appl. No.: 15/956,765

(22) Filed: Apr. 19, 2018

(65) Prior Publication Data
US 2018/0238373 A1 Aug. 23, 2018

Related U.S. Application Data

(63) Continuation-in-part of application No. 13/726,536, filed on Dec. 24, 2012, now abandoned.

(51) Int. Cl.
*F16B 25/02* (2006.01)
*F16B 25/10* (2006.01)
*F16B 25/00* (2006.01)

(52) U.S. Cl.
CPC ........ *F16B 25/103* (2013.01); *F16B 25/0084* (2013.01); *F16B 25/0015* (2013.01)

(58) Field of Classification Search
CPC .............. F16B 25/103; F16B 25/0084; F16B 25/0015; B23B 51/0009; B23B 2251/18
USPC ........................................... 411/387.1, 387.5
See application file for complete search history.

(56) References Cited

U.S. PATENT DOCUMENTS

| | | | | |
|---|---|---|---|---|
| 3,318,182 A * | 5/1967 | Carlson | ............... | F16B 25/0084 411/387.6 |
| 3,715,952 A * | 2/1973 | Fischer | ............... | F16B 13/0858 411/29 |
| 4,016,795 A * | 4/1977 | Gill | .......................... | B21K 1/56 411/387.8 |
| 4,257,307 A * | 3/1981 | Regensburger | ..... | F16B 25/0094 408/228 |
| 4,730,969 A * | 3/1988 | Dohi | .................... | F16B 25/0084 408/211 |
| 5,403,137 A * | 4/1995 | Grun | ....................... | B25B 13/48 29/456 |
| 5,551,818 A * | 9/1996 | Koppel | ................. | F16B 19/083 411/387.1 |
| 5,749,689 A * | 5/1998 | Konig | ................. | F16B 25/0084 411/387.4 |
| 6,250,866 B1 * | 6/2001 | Devine | ............... | F16B 25/0026 411/387.4 |
| 6,698,987 B1 * | 3/2004 | Dicke | ................. | F16B 25/0031 411/387.4 |
| 2005/0158133 A1 * | 7/2005 | Hill | ...................... | B23B 51/0009 408/228 |

* cited by examiner

*Primary Examiner* — Flemming Saether

(57) ABSTRACT

A screw with a flat drilling end comprises a cylinder (1) with a thread (11) wrapped around and a flat drill portion (2) longitudinally extended from a distal end of the cylinder (1); a maximum thickness (T) of a transversal cross section of the flat drill portion (2) being less than a half of the maximum width (D) of the transversal cross section of the flat drill portion (2); the maximum width (D) of the transversal cross section of the flat drill portion (2) being smaller than an outer diameter of the thread (11) of the cylinder (1); the width and thickness of the transversal cross section of the flat dill portion (2) being reduced to a point tip end of the flat drill portion (2). Two opposite lateral sides form as sharp knife blades.

1 Claim, 2 Drawing Sheets $T \leq \tfrac{1}{2} D$, $d1 < D < d2$

T≤½D, d1<D<d2

SCREW WITH FLAT DRILLING END

The present invention is a continuation in part (CIP) of U.S. patent application Ser. No. 13/726,536, which has the same inventor and is assigned to the applicant of the present invention. Therefore, contents of U.S. patent application Ser. No. 13/726,536 is incorporated into the present invention as a part of the present invention.

FIELD OF THE INVENTION

The present invention relates to screws, and in particular to a screw with a flat drilling end.

DESCRIPTION OF THE PRIOR ART

Screws used to drill and fasten an object have various designs to achieve fast drill, debris ejection, and secure fastening without split such as single thread, double thread, or variation of thread angle. There are also different screw types for different purposes such as screw for metal, wood, or plastic. For the screws used against hard wood, a feature of split prevention has to be considered.

Most of conventional screw designs are emphasized on drilling speed or debris ejection through the screw end. However, the causes of crash to a working piece or threaded hole are usually the extruding of debris during the drilling. For there is not enough space for receiving and ejecting the debris, a split to the working piece or crash to the inner thread of a hole can be easily happened by the compression.

Therefore, to create a screw having a better split prevention is an urgent objective to be accomplished.

SUMMARY OF THE PRESENT INVENTION

Accordingly, the primary object of the present invention is to provide screw with a flat drilling end for easily receiving and ejecting debris during the drilling with power-saving and split prevention.

To achieve above object, the present invention provides a screw with a flat drilling end comprising a cylinder (1) with a thread (11) wrapped around and a flat drill portion (2) longitudinally extended from a distal end of the cylinder (1); a maximum thickness (T) of a transversal cross section of the flat drill portion (2) being less than a half of the maximum width (D) of the transversal cross section of the flat drill portion (2); the maximum width (D) of the transversal cross section of the flat drill portion (2) being smaller than an outer diameter of the thread (11) of the cylinder (1); the width and thickness of the transversal cross section of the flat dill portion (2) being reduced to a point tip end of the flat drill portion (2). Two opposite lateral sides form as sharp knife blades.

DETAILED DESCRIPTION OF THE DRAWINGS

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 6, preferable embodiments of a flat drill end of a screw according to the present invention are illustrated. The flat drill end of a screw is suitable for screw ends of various drill screws for wood with split prevention.

The embodiments of the flat drill end of a screw generally includes a cylinder 1 having a thread 11 wrapped around the cylinder 1 and a flat drill portion 2 longitudinally extended from a distal end of the cylinder 1. A maximum thickness T of a transversal cross section of the flat drill portion 2 is less than a half of the maximum width D of the transversal cross section of the flat drill portion 2. The maximum width D of the transversal cross section of the flat drill portion 2 is smaller than an outer diameter of the thread 11 of the cylinder 1. The width and thickness of the transversal cross section of the flat dill portion 2 are reduced to a point tip end of the flat drill portion 2.

Figure 3:
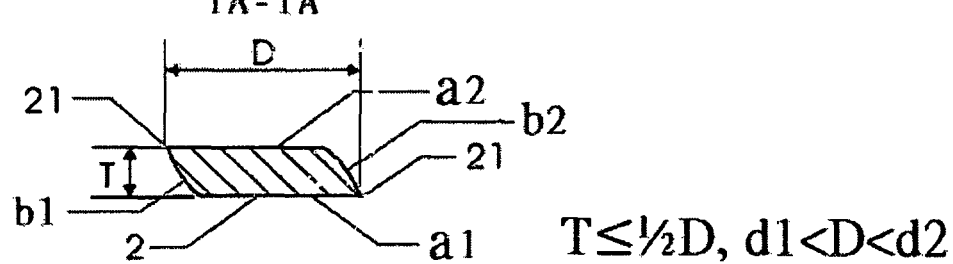
FIG. 3 is a cross-section view through a line 1A-1A in FIG. 2.
Figure 4:
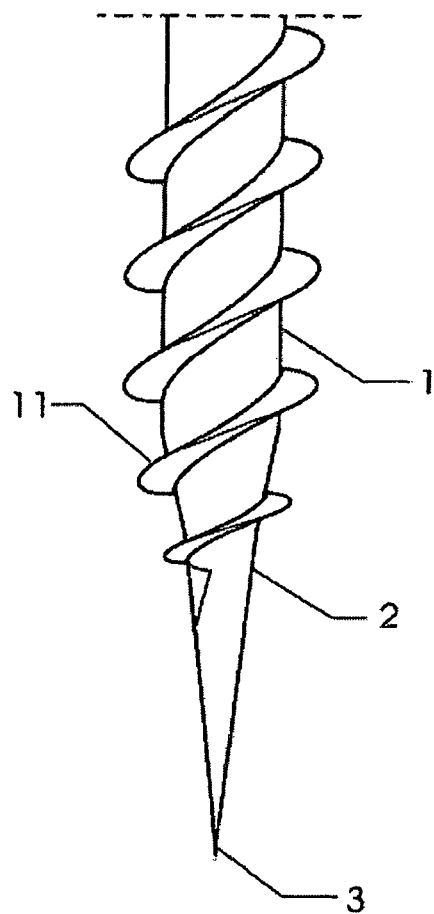
FIG. 4 is a schematic view showing an embodiment 2 of the present invention.
Figure 5:
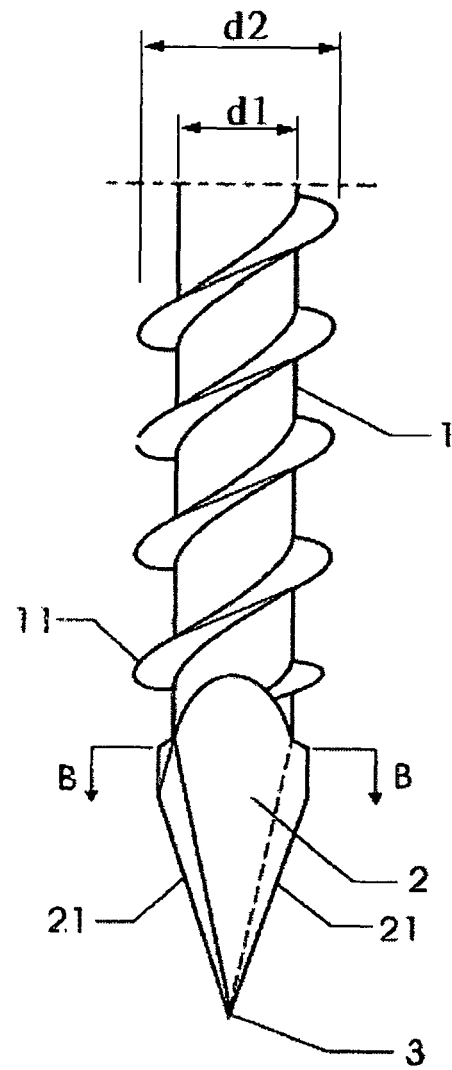
FIG. 5 is a right side view of the embodiment 2 shown in FIG. 4.
Figure 6:
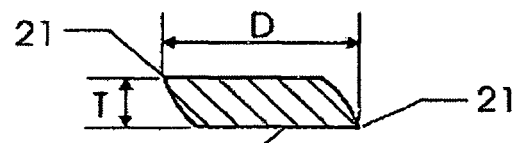
FIG. 6 is a cross-section view through a line B-B in FIG. 5.

As illustrated in FIGS. 3 and 6, two lateral sides, i, e., two opposite sides with one side indicating with T, form as sharp knife blades 21.

In the present invention, a large space is provided for receiving debris and the debris can be removed smoothly and quickly, the drilling operation is quick with a small power used. Furthermore, the screw will not broken down.

Figures 1, 2:
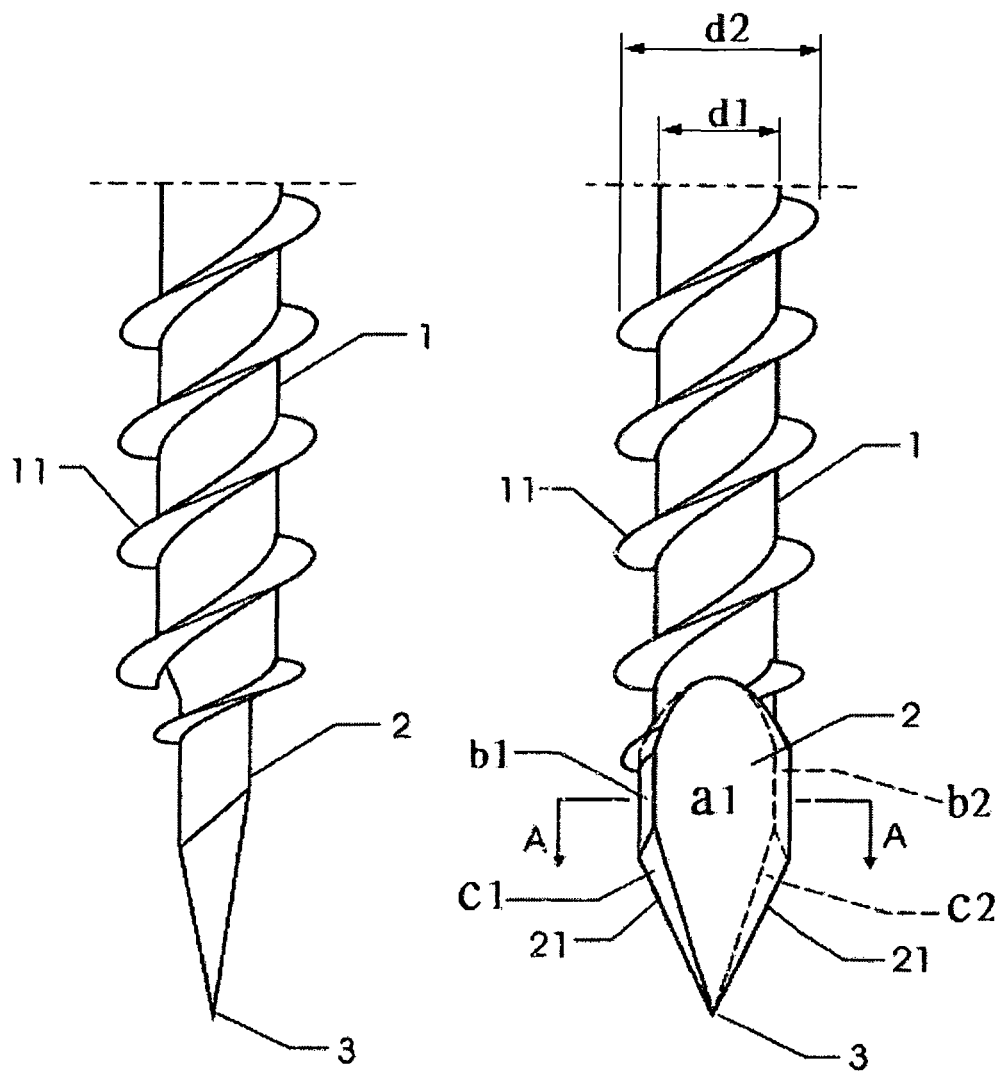
FIG. 1 is a schematic view showing an embodiment of the present invention.
FIG. 2 is a right side view of FIG. 1.

Preferably, as shown in FIGS. 2 and 3, two opposite lateral surfaces of the flat drill portion (2) are two outward convex curved planes (b1), (b2) respectively, the two outward convex curved planes (b1), (b2) of the flat drill portion (2) connect with two parallelly straight planes (a1), (a2) respectively, and the two parallelly straight planes (a1), (a2) connect with two tilted lateral sides (c1), (c2) respectively, wherein the two tilted lateral sides (c1), (c2) extend to a point tip end (3) of the flat drill portion (2) so as to form two sharp knife blades (21) respectively wherein a thickness (T) of the flat drill portion (2) is less than a half of a width (D) of the flat drill portion (2). The width (D) of the flat drill portion (2) is more than a diameter (d1) of the cylinder (1) and is less than the diameter (d2) of the thread (11).

The cylinder (1) is one-piece form with the thread (11) and the flat drill portion (2) so as to form an integrally formed the screw with the flat drill portion (2) so that the screw is drilled into wood completely.

The screw is drilled into the wood easily and quickly, accommodates lots of chips, and eliminates the chips smoothly with split prevention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A screw with a flat drilling end comprising:
   a cylinder (1) having a drill end and a thread (11) wrapped around the cylinder (1);
   a flat drill portion (2) formed to the cylinder (1) along to the drill end of the cylinder (1) with a predetermined length;
   wherein a thickness (T) of the flat drill portion (2) is less than a half of a width D of the flat drill portion (2);
   wherein the flat drill portion (2) has an arcuate portion formed on a top thereof and connected with the thread (11);
   wherein two opposite lateral surfaces of the flat drill portion (2) are two outward convex curved planes (b1), (b2) respectively, the two outward convex curved planes (b1), (b2) of the flat drill portion (2) connect with two planes (a1), (a2) respectively, wherein the two planes (a1), (a2) converge towards one another between two tilted lateral sides (c1)(c2) in a direction of a point tip, and the two planes (a1), (a2) are parallel between the two outward convex curved planes (b1), (b2), wherein the two tilted lateral sides (c1), (c2) extend to a point tip end (3) of the flat drill portion (2) so as to form two sharp knife blades (21) respectively, a width of the tilted lateral side (c1) decreases from a first end of the tilted lateral side (c1) adjacent to the thread (11) to a second end of the tilted lateral side (c1) connected with the point tip end (3), and a width of the tilted lateral side (c2) decreases from a first end of the tilted lateral side (c2) adjacent to the thread (11) to a second end of the tilted lateral side (c2) connected with the point tip end (3);
   wherein the width (D) of the flat drill portion (2) is more than a diameter (d1) of the cylinder (1);
   wherein the cylinder (1) is one-piece formed with the thread (11) and the flat drill portion (2).

* * * * *